United States Patent

Takihara et al.

[11] Patent Number: 5,922,380
[45] Date of Patent: Jul. 13, 1999

[54] TEA MANUFACTURING PROCESS

[75] Inventors: Takanobu Takihara; Hitoshi Kinugasa; Hitoshi Niino; Yuko Sagesaka, all of Shizouka-ken; Toshio Kawasaki, Iwatsuki-shi; Nobuo Matsumoto; Kenji Shimaoka, both of Shizouka-ken; Masami Sasame; Takashi Yamamoto, both of Shizouka-ken, all of Japan

[73] Assignee: Ito En, Ltd., Tokyo, Japan

[21] Appl. No.: 08/986,357

[22] Filed: Dec. 8, 1997

[30] Foreign Application Priority Data

Dec. 12, 1996 [JP] Japan .................................. 8-331978

[51] Int. Cl.$^6$ .................................. A23C 9/14; A23F 3/00
[52] U.S. Cl. .......................... 426/271; 426/597; 426/422
[58] Field of Search .................................. 426/597, 271, 426/422

[56] References Cited

U.S. PATENT DOCUMENTS

| | | |
|---|---|---|
| 3,163,539 | 12/1964 | Barch ........................................ 426/271 |
| 3,531,296 | 9/1970 | Smithies . |
| 3,878,991 | 4/1975 | Sabadics et al. ........................ 426/453 |
| 4,680,193 | 7/1987 | Lunder et al. ........................... 426/271 |
| 4,748,033 | 5/1988 | Syfert et al. ............................. 426/597 |
| 5,445,836 | 8/1995 | Agbo et al. .............................. 426/597 |

FOREIGN PATENT DOCUMENTS

| | | |
|---|---|---|
| 50-154462 | 12/1975 | Japan . |
| 61-209573 | 9/1986 | Japan . |
| 1284387 | 11/1989 | Japan . |
| 2291230 | 12/1990 | Japan . |
| WO 9730597 | 8/1997 | WIPO . |

*Primary Examiner*—Anthony J. Weier
*Attorney, Agent, or Firm*—McDermott, Will & Emery

[57] ABSTRACT

Tea leaves are extracted in warm or hot water, and the obtained extract is contacted with a cation exchange resin ionically bonded to potassium ion. The potassium ion is ionically bonded to the cation exchange resin in advance. Divalent ions in the tea beverage are replaced with the potassium ions from the cation exchange resin. The electrical conductivity of the extract is controlled in this whole process. The natural flavor and quality of the tea are thereby maintained more certainly, since metal ions that cause muddiness or precipitation are effectively removed.

20 Claims, No Drawings

TEA MANUFACTURING PROCESS

BACKGROUND OF THE INVENTION

1. Field of the Invention

The present invention relates to a manufacturing process of tea in which any muddiness or precipitate does not occur during storage for a long time. The tea has excellent flavor and is suitable especially as a transparent container type product.

2. Description of the Prior Art

Sometimes the muddiness and precipitate occur during storage of the produced tea beverages, particularly the green tea beverages, for a long time. The solution of this phenomenon has been an important point in manufacturing process for a transparent container type of tea beverage. It is considered that this phenomenon is due to precipitate formed by the binding of metal ions extracted from tea leaves and protein, pectin, polyphenol or the like also extracted from the leaves. Therefore, for the prevention of precipitation in the tea beverages, it has been important to remove the metal ions extracted from tea leaves.

As one of conventional measures against this phenomenon, a removal method of the metal ions is described in Japanese Laid-Open Patent Publication No. 154462/1975. In this method, an enzyme mixture containing tannase, cellulase, hemicellulase, xylanase, pectinase or the like is added to the tea extract for solution of a precipitate like cream, then this extract is treated with cation exchange resin for removal of metal ions such as calcium, aluminum, magnesium, manganese, iron and the like contained therein.

This method has been worth notice, in that the metal ions are effectively removed, and a large-scale equipment is not necessary. However, there has been a problem in this method that the natural flavor of tea is changed and spoilt.

SUMMARY OF THE INVENTION

In view of the above-mentioned problems, the present inventors have set up the object of the present invention, which is to provide a manufacturing process of tea in which muddiness and precipitate do not occur during storage of the produced beverages for a long time, and furthermore the peculiar flavor of tea is not spoilt.

Potassium ion is ionically bonded to cation exchange resin beforehand. On the other hand, tea leaves are extracted in warm or hot water, and the obtained tea extract is cation exchanged with the cation exchange resin bonded to potassium ion. Tea beverages are made from the cation exchanged tea extract.

As described above, tea in which tea extract is treated for cation exchange with cation exchange resin bonding to potassium ion keeps its natural flavor and metal ions in the extract causing the muddiness and precipitation during storage for a long time are effectively removed therefrom, in comparison with tea in which tea extract is treated for cation exchange by use of a resin not bonding to potassium ion.

Incidentally, in the present invention, "tea" means not only tea beverage, but also concentrate or dried powder, which is made from tea extract or tea beverage.

DETAILED DESCRIPTION OF THE INVENTION

The present inventors studied earnestly about the cation exchange treatment of tea extract and have completed this invention based on the findings that: the natural flavor of tea is kept by ion-exchange treatment with a specific pre-treated cation exchange resin; it is kept even more certainly by temperature control at the ion-exchange treatment; occurrence of muddiness and precipitate of tea during storage for a long time is prevented by pH adjustment of the tea extract to a certain range; and the natural flavor is kept even more certainly by adjustment of electric conductivity of the tea extract and tea beverage.

Hereinafter, the present invention will be specifically explained.

In the present invention, it is required that potassium ion is ionic bonded to the cation exchange resin beforehand.

As the cation exchange resin, before potassium ions are bonded, it is possible to use a resin having functional groups for cation exchange such as a sulfonic acid group($-SO_3H$), a phosphoric acid group($-PO(OH)_2$), and a carboxyl group ($-COOH$). A resin having sulfonic acid group such as styrene-divinylbenzene copolymer resin is preferable, because divalent metal ions are ionic bonded preferentially to this resin in a wide range of pH. Concretely, the above suitable resins include SK series such as Diaion SK1B and the like, PK series such as Diaion PK 208 and the like (the above products are made by Mitsubishi Kagaku Co.), 50W series such as Dowex 50W. X1, Dowex HCR series, Dowex HGR series (the above products are made by Dow Chemical Co.), Amberlite No. 100 series such as IR-120B and the like, Amberlite No. 200 series such as IR-200C and the like (the above products are made by Rohm and Hass Co.).

As a method for ionic bond of potassium ion and cation exchange resin, for example, contact of cation exchange resin and potassium chloride aqueous solution having a proper concentration is given.

First, tea leaves are extracted in warm or hot water.

Then, the tea extract is ion-exchanged with the cation exchange resin bonding to potassium ion, and the ion-exchanged extract is obtained.

As the cation exchange treatment of tea extract, it is possible to choose between a column method of letting the extract flow through a filled column with the cation exchange resin bonding to potassium ion and a batch method in which the extract is contacted to the resin in a tank or the like. The former (column method) is preferable for continuous and effective treatment of extract.

In the cation exchange treatment of the tea extract, it is preferred to control temperatures of both cation exchange resin and the extract within the range from 5 to 65° C., and further preferable temperature is within the range from 5 to 45° C. By the above temperature control, the excellent flavor of tea is kept in the tea beverage. In addition, if the temperature exceeds 65° C., the flavor changes during the cation exchange treatment, and the natural flavor tends to be spoilt. In the case of the temperature lower than 5° C., it is possible to treat the extract for cation exchange at temperatures as low as the extract does not freeze, but the running cost is likely to increase substantially because a burden of chiller becomes large.

The pH adjustment of the extract to the range from 4.75 to 7 before the cation exchange treatment is effective in preventing occurrence of muddiness and precipitate in tea beverage during storage for a long time, no matter how the extract is sterilized after the cation exchange treatment. And furthermore the adjustment of pH to the range from 5 to 6.5 is more effective in keeping the natural taste of tea. But in the case of the pH lower than 4.75, slight muddiness or precipitate may be formed during storage for a long time by the choice of a certain sterilizing method. In the case of the pH more than 7, the amount of the constituents concerning in taste decreases remarkably, and the natural taste of tea is spoilt.

However, if the ultra-high temperature sterilizing treatment (it is also referred to as UHT sterilization or high-temperature short-time heating sterilization. It is a sterilizing treatment method in accordance with Hygienic Food No. 244 and 245, partly modified "Standard of Foods and Additives" based on the Food Sanitation Law, Articles 7 and 10) is carried out after the cation exchange treatment, the pH of the warm or hot water extract of tea leaves is only to be adjusted to 7 or below before the cation exchange treatment, and thereby tea beverages in which muddiness and precipitate do not occur during storage for a long time are produced. In the case of the pH more than 7, the amount of the constituents concerning in taste decreases remarkably, and the natural taste of tea is spoilt. For the ultra-high temperature sterilizing treatment, it is possible to use a plate-type heat exchanger or a tube-type heat exchanger, and both a continuous treatment and a short-time treatment are performed by use of them.

After the cation exchange treatment, the electric conductivity of the ion-exchanged extract is adjusted within a range from 0.4 to 1 mS/cm, more preferably, from 0.6 to 0.8 mS/cm, and furthermore, tea beverages obtained from the adjusted extract are also adjusted within said range of the electric conductivity. In the tea beverage having the electric conductivity lower than 0.4 mS/cm, the natural flavor of tea attenuates and is spoilt. In the beverage in which the electric conductivity is higher than 1 mS/cm, a bitter and astringent taste is too strong.

The present inventors have found that the good quality of tea is kept by the control of electric conductivity in the whole manufacturing process of tea according to the present invention. For example, by controlling the raised electric conductivity of the tea extract within a range from 12.7 to 20.1% at this cation exchange treatment as well as by adjusting the electric conductivity of the ion-exchanged extract to a range from 0.4 to 1 mS/cm, the quality of tea is certainly kept.

Tea beverages produced according to the present invention are particularly preferable as beverages for transparent containers such as glass bottles, plastic bottles, and the like, because muddiness and precipitate do not occur during storage for a long time respectively, and the favorable natural flavor of tea is kept.

Because the used cation exchange resin is easily regenerated with potassium chloride aqueous solution without use of any organic solvent, this method shown in the present invention has an economic advantage.

Furthermore, by concentration or dry treatment of the produced tea beverage according to the present invention, it is also possible to produce the concentrated extract or powder keeping the natural flavor of tea.

The manufacturing process of tea, which is shown in the present invention is applicable not only for unfermented tea such as green tea, but also for semi-fermented tea (oolong tea and the like), strongly fermented tea (black tea and the like), jasmine tea or the like.

DESCRIPTION OF PREFERRED EMBODIMENTS

Preferred manufacturing processes of tea are shown as follows.

Beforehand, potassium ion is bonded to a styrene-divinylbenzene copolymer resin having sulfonic acid group.

Tea leaves are extracted with warm or hot water, preferably with ion-exchanged water. After removal of the tea leaves from this tea extract, the pH of the tea extract is adjusted within the range from 4 to 7 by L-ascorbic acid or sodium bicarbonate, and the temperature of the extract is adjusted within the range from 5 to 65° C. Then, the precipitates or suspended solids in the extract are removed by centrifugation, and after this stage, a check is made on whether the pH of the extract is in the range from 4.75 to 7, preferably from 5 to 6.5, and whether the temperature of the extract is in the range from 5 to 65° C., preferably from 5 to 45° C., respectively. If they are out of the predetermined range, the temperature and pH are adjusted again.

Then, the obtained extract is treated for cation exchange by the cation exchange resin bonding to potassium ion. At this time, the resin temperature is controlled in the range from 5 to 65° C., preferably from 5 to 45° C., so that the cation exchange treatment is performed at the predetermined temperature. If a column is used for the treatment, the temperatures of the extract at the inlet and at the outlet of the column are controlled to the above range of temperature.

The pH of the obtained tea extract treated with the cation exchange resin (hereinafter, this liquid will be referred to as "ion-exchanged extract") is adjusted to about 6 with sodium bicarbonate and the like, further the electric conductivity of the extract is adjusted to the range from 0.4 to 1 mS/cm, preferably from 0.6 to 0.8 mS/cm. Then, the ion-exchanged extract is heated up to the range from 90 to 95° C., filled to a bottle and sealed under blowing nitrogen gas. Sterilization of the bottle is carried out at 121° C. for about 7 to 11 minutes.

Incidentally, in the case of aseptic filling after the ultra-high temperature sterilizing treatment, the preferred manufacturing process is as follows. According to the same manner as the above, tea leaves are extracted, and after the adjustment of its pH and temperature fine filtration or centrifugation is carried out. Then, a check is made on whether the pH of the extract is 7 or lower than 7 and whether the temperature thereof is in the range of 5 to 65° C., preferably from 5 to 45° C. If they are out of the predetermined range, the temperature and pH are adjusted again. Then, the obtained extract is treated for cation exchange at the temperatures of the extract within the range from 5 to 65° C., preferably from 5 to 45° C. The pH of the ion-exchanged extract is adjusted to about 6 with sodium bicarbonate and the like, further the electric conductivity of the cation exchanged extract is adjusted in the range from 0.4 to 1 mS/cm, preferably from 0.6 to 0.8 mS/cm. A continuous sterilization of the extract is carried out under the condition at temperatures of from 132.5 to 134.5° C. for about 30 seconds, then, the thus obtained extract is filled into a bottle and sealed.

EXAMPLE 1

In this example, influence of bonded ions to cation exchange resin on the quality of green tea beverage was investigated.

As a pretreatment of the cation exchange resin, SK1B which was a styrene-divinylbenzene copolymer resin having sulfonic acid group was filled into a column, and then various kinds of ions were bonded to resin by the flow of the solutions shown in Table 1 into the column.

On the other hand, 100 g of green tea leaves were extracted with 10 liters of ion-exchanged water of 67~73° C. for 4 minutes, thereafter the tea leaves were removed from the extract. The extract was adjusted to about pH 4.5 with L-ascorbic acid, and cooled to less than 20° C. Then, after removal of precipitates and suspended solids in the cooled extract by centrifugation, the extract was ion-exchanged by the pre-treated cation exchange resins.

The obtained cation exchanged extract was adjusted to pH 6.0 with sodium bicarbonate, heated up to 95° C., filled into a can having a capacity of 200 ml, and sealed under blowing nitrogen gas. Then, the canned extract was sterilized at 121° C. for 11 minutes, and tea beverages are obtained as finished product.

A control sample was prepared by the same process as described above, in which the cation exchange treatment was excepted. And a sensory test on the liquid color, taste, and aroma in each of the above tea beverages and the control sample was executed, and the results were shown in Table 1.

TABLE 1

| Pretreatment solution to the resin | Liquid color | Taste | Aroma | Overall evaluation |
|---|---|---|---|---|
| Control | ○ | ◎ | ◎ | ○ |
| Hydrochloric acid | ◎ | X | ◎ | X |
| Sodium chloride | ◎ | X | ◎ | X |
| Potassium chloride | ◎ | ◎ | ◎ | ◎ |

◎: very good
○: good
X: bad

From the results shown in Table 1, it was confirmed that there was a difference in taste between the tea beverages. The taste of the tea beverage treated with potassium chloride was very good, but the tea beverages treated with hydrochloric acid and sodium chloride had a strong salty taste and the natural flavor of tea in them was remarkably spoilt respectively, particularly the taste attenuated noticeably in the hydrochloric acid treatment.

EXAMPLE 2

In this example, influence of the pH of green tea extract before cation exchange treatment on the quality of product was investigated.

After pre-treatment of SK1B with potassium chloride aqueous solution, the steps were carried out from extraction of green tea leaves to centrifugation of the extract according to the same process as Example 1. The extract was adjusted to various pH levels shown in Table 2 with L-ascorbic acid and/or sodium bicarbonate. The pH-adjusted extract was ion-exchanged by letting it flow through said pre-treated cation exchange resin, and the ion-exchanged extract was filled into a can according to the method shown in Example 1 to produce canned beverages. The products packed in a transparent glass bottle were also made and stored at 37° C.

A control sample was prepared by the same process as described above, in which the cation exchange treatment was excepted.

The percentage of raised electric conductivity of extract and the concentration of the constituents concerning in taste were measured with respect to the above canned products, and occurrence of precipitates during 4 weeks of storage(37° C.) was observed with respect to the products packed in the transparent bottle. The results were shown in Table 2.

Incidentally, the electric conductivity of extract was measured by a electric conductivity meter and the percentage of raised electric conductivity was calculated as follows: 100x (conductivity after contact to resin—conductivity before contact to resin) /conductivity before contact to resin.

The concentrations of constituents concerning in taste in the tea beverages were measured by a high performance liquid chromatography with respect to the following: epigallocatechin gallate (EGCg) and epigallocatechin (EGC) concerning in an astringent taste, caffeine (CAF) concerning in the bitter taste, theanine and glutamic acid (Glu) concerning in the umami taste. And the concentrations of calcium ion ($Ca^{2+}$) and magnesium ion ($Mg^{2+}$)in the tea beverage were measured by an ion chromatography.

TABLE 2

| pH | Control | 4.0 | 4.5 | 4.75 | 5.0 | 5.5 | 6.0 | 6.5 | 7.0 | 7.5 |
|---|---|---|---|---|---|---|---|---|---|---|
| Raised electric conductivity (%) | — | 10.3 | 12.2 | 12.7 | 13.3 | 14.3 | 15.9 | 18.9 | 20.1 | 20.6 |
| EGCg + EGC (g/l) | 0.22 | 0.20 | 0.20 | 0.20 | 0.20 | 0.20 | 0.20 | 0.20 | 0.20 | 0.14 |
| CAF (g/l) | 0.15 | 0.15 | 0.15 | 0.15 | 0.15 | 0.15 | 0.15 | 0.15 | 0.15 | 0.10 |
| THE + Glu (g/l) | 0.029 | 0.029 | 0.029 | 0.029 | 0.029 | 0.029 | 0.029 | 0.029 | 0.029 | 0.021 |
| $Ca^{2+}$ (mg/l) | 4.6 | ▼ | ▼ | ▼ | ▼ | ▼ | ▼ | ▼ | ▼ | ▼ |
| $Mg^{2+}$ (mg/l) | 7.4 | ▼ | ▼ | ▼ | ▼ | ▼ | ▼ | ▼ | ▼ | ▼ |
| Occurence precipitate after storage | ++++ | ++ | + | — | — | — | — | — | — | — |
| Taste | ◎ | ○ | ◎ | ◎ | ◎ | ◎ | ◎ | ◎ | ◎ | X |
| Liquid color | ○ | ◎ | ◎ | ◎ | ◎ | ◎ | ◎ | ◎ | ○ | X |
| Overall evaluation | X | X | X | ◎ | ◎ | ◎ | ◎ | ◎ | ○ | X |

◎: very good
○: good
X: bad
▼: not detected
—: no occurence of precipitate or muddiness
+: slight occurence of precipitate or muddiness
++: ↑
+++: ↓
++++: a large quantity of precipitate or muddiness As shown in Table 2, the electric conductivity of the extract was raised by the cation exchange treatment without reference to the pH level of the extract.

In the treatment at pH 4.0~7.0 (the percentage of raised electric conductivity: 10.3~20.1%), little change was observed in the concentrations of constituents concerning in taste, such as epigallocatechin gallate+epigallocatechin, caffein, and theanin+glutamic acid, and the taste of beverages was very good. On the other hand, in the case of pH 7.5 (the percentage of raised electric conductivity: 20.6%), a decrement of about 30% in concentration of each constituent in comparison with that of the control sample and the spoilt taste were shown.

A tendency of liquid color to be degraded was shown at pH 7 (the percentage of raised electric conductivity: 20.1%) or higher.

Both of concentrations of calcium ion and magnesium ion decreased to non-detectable level by the cation exchange treatment without reference to the pH of used extract.

During the storage (at 37° C. for 4 weeks), a great quantity of precipitate occurred in the control sample. However, little precipitate was found in the products in which the extracts were ion-exchanged, and slight precipitate occurred in the treatments of pH 4.5 (the percentage of raised electric conductivity: 12.2%) and below. It is suggested that the occurrence of precipitate in the treatment of pH 4.5 and below was not caused by the calcium ion or magnesium ion because calcium ion and magnesium ion are sufficiently removed even at pH 4.5 (the raised electric conductivity: 12.2%) or below.

EXAMPLE 3

In this example, in the case of aseptic filling after the ultra-high temperature sterilizing treatment, influence of the pH of green tea extract before cation exchange treatment on the quality of product was investigated.

Extracts which were adjusted to various pH levels shown in Table 3 beforehand according to the same process shown in Example 2 were ion-exchanged by the cation exchange resin bonding to potassium ion. The obtained ion-exchanged extracts were adjusted to pH 6.0 with L-ascorbic acid and/or sodium bicarbonate. These pH-adjusted extracts were sterilized continuously at 133° C. for 30 seconds by a plate-type heat exchanger, respectively, and were aseptically filled in a PET bottle at a filling temperature of 85° C. The products were rapidly cooled after the filling and stored under 37° C.

A control sample was prepared by the same process as described above, in which the cation exchange treatment was excepted. Occurrence of precipitates during 4 weeks of storage(at 37° C.) was observed with respect to each of the above tea beverages and the control, and the results were shown in Table 3.

TABLE 3

| pH | Control sample | 4.0 | 4.5 | 5.0 | 5.5 | 6.0 | 6.5 |
|---|---|---|---|---|---|---|---|
| Occurence of precipitate after storage | ++++ | — | — | — | — | — | — |
| Taste | ⊙ | ○ | ⊚ | ⊚ | ⊚ | ⊚ | ⊚ |
| Liquid color | ○ | ⊚ | ⊚ | ⊚ | ⊚ | ⊚ | ⊚ |

TABLE 3-continued

| pH | Control sample | 4.0 | 4.5 | 5.0 | 5.5 | 6.0 | 6.5 |
|---|---|---|---|---|---|---|---|
| Overall evaluation | X | ○ | ⊚ | ⊚ | ⊚ | ⊚ | ⊚ |

⊚: very good
○: good
X: bad
—: no occurence of precipitate or muddiness
+: slight occurence of precipitate or muddiness
++: ↑
+++: ↓
++++: a large quantity of precipitate or muddiness As a result, no precipitate was found in any of the ion-changed beverages after storage. Furthermore, the taste of the beverages in almost all of treatments of various pH levels was very good, except the treatment of pH 4.0 in which a salty taste was slightly strong.

From the results of Example 2 and Example 3, it was found that the pH adjustment of tea extract to 4.75 or higher before cation exchange treatment was preferable for the prevention of precipitation in tea beverage in spite of storage thereof for a long time and without reference to the method of sterilization. Although slight precipitate might occur during storage for a long time in the case that pH range of extract before the cation exchange treatment is 4.75 or below, with an ultra-high temperature sterilization treatment thereafter, it is possible to produce tea beverages in said pH range, in which precipitate does not occur even if stored for a long time.

By adjusting the pH of the extract to 7 or below before the cation exchange treatment, the natural taste of tea can be kept.

EXAMPLE 4

In this example, influence of temperature control at the cation exchange treatment on the quality of product was investigated.

After steps were carried out from the pre-treatment of resin to centrifugation according to the process shown in Example 2, the pH of the centrifuged extract was adjusted to 5.8, and then its temperature was controlled to various ranges shown in Table 4. The temperature-controlled extract was ion-exchanged by the cation exchange resin bonding to potassium ion which was controlled to the same temperature as that of the extract. Then, the canned tea beverage products and the packed beverage products in transparent bottle were made from the above ion-exchanged extract according to the same process shown in Example 2. The beverages packed in transparent bottle were kept at 37° C. for 4 weeks, and occurrence of precipitate was observed. A test on liquid color, taste, and aroma with respect to each beverage ted. The results were shown in Table 4.

TABLE 4

| Range of temperature control (° C.) | Liquid color | Taste | Aroma | Precipitate | Overall evaluation |
|---|---|---|---|---|---|
| 5~10 | ⊚ | ⊚ | ⊚ | — | ⊚ |
| 20~25 | ⊚ | ⊚ | ⊚ | — | ⊚ |
| 40~45 | ⊚ | ⊚ | ⊚ | — | ⊚ |
| 60~65 | ○ | ○ | ⊚ | — | ○ |

TABLE 4-continued

| Range of temperature control (° C.) | Liquid color | Taste | Aroma | Precipitate | Overall evaluation |
| --- | --- | --- | --- | --- | --- |
| 80~85 | X | ◯ | ◯ | — | X |

◎: very good
◯: good
X: bad
—: No occurence

From the results shown in Table 4, a good liquid color, natural taste, and natural aroma of tea were kept in the beverage treated at the temperature of 45° C. and below. The quality of tea beverage treated at the temperature from 60 to 65° C., was nearly good, but its liquid color and taste were spoilt slightly. The quality of the beverage treated at the temperature from 80 to 85° C. was degraded, particularly, the noticeable degeneration in liquid color was observed. On the other hand, no precipitate was observed in any of the temperature ranges.

EXAMPLE 5

In this example, influence of the electric conductivity of extract after cation exchange treatment on the quality of product was investigated.

According to the same process shown in Example 2, a resin was pre-treated with potassium chloride aqueous solution. On the other hand, 250 g of tea leaves were extracted with 10 liters of the ion-exchanged water at a temperature of 67–73° C. for 4 minutes, and the centrifuged extracts was obtained by the same process as Example 1. The obtained extract was ion-exchanged by the above pre-treated resin. The pH of the ion-exchanged extract was adjusted to 6.0 with sodium bicarbonate and furthermore the electric conductivity also was adjusted to various levels. Then, beverages were made from the above extract according to the sterilizing method, the filling and cooling method shown in Example 3.

A sensory test on liquid color, taste, and aroma of each tea beverage was executed, and the results were shown in Table 5. The electric conductivity (mS/cm) was measured by a electric conductivity meter.

TABLE 5

| Electric conductivity (mS/cm) | Liquid color | Taste | Aroma | Overall evaluation |
| --- | --- | --- | --- | --- |
| 0.2 | X | X | X | X |
| 0.4 | ◯ | ◯ | ◯ | ◯ |
| 0.6 | ◎ | ◎ | ◎ | ◎ |
| 0.8 | ◎ | ◎ | ◎ | ◎ |
| 1.0 | ◎ | ◯ | ◎ | ◯ |
| 1.2 | ◯ | X | ◎ | X |
| 1.4 | X | X | ◎ | X |

◎: very good
◯: good
X: bad

As a result, it was found that the electric conductivity of green tea beverage should be adjusted within a range from 0.4 to 1.0 mS/cm, preferably 0.6 to 0.8 mS/cm for keeping the suitable intensity of the flavor. In the tea beverages having a electric conductivity lower than 0.4 mS/cm, the flavor was light and was not like tea. Furthermore, in the tea beverages having a electric conductivity higher than 1.0 mS/cm, the bitter taste and the astringent taste were too strong.

EXAMPLE 6

Influence of different methods for prevention of precipitation, which are the cation exchange treatment, the filtration with diatomaceous earth and ultra-filtration, on the quality of green tea beverage was investigated.

In the manufacturing process using the cation exchange treatment, the pH of tea extract was adjusted to 5.0 before the cation exchange treatment, other processes were carried out as same as Example 2 to produce tea beverages.

On the other hand, tea beverages were produced by carrying out the filtration with diatomaceous earth or ultra-filtration after centrifugation of the extract in the manufacturing process in addition to the steps according to the above Example 2. The used membrane in ultra-filtration had the efficiency to catch the substance having molecular weight of about 10,000.

A sensory test on liquid color, taste, and aroma of each of tea beverages was executed, and occurrence of precipitate of the beverages during storage at 37° C. for 4 weeks was observed. The results were shown in Table 6.

TABLE 6

| Treatment method | Liquid color | Taste | Aroma | Precipitate | Overall evaluation |
| --- | --- | --- | --- | --- | --- |
| Cation exchange treatment | ◎ | ◎ | ◎ | — | ◎ |
| Filtration with diatomaceous earth | ◎ | X | X | — | X |
| Ultra-filtration | ◎ | X | ◯ | — | X |

◎: very good
◯: good
X: bad
—: No occurence

As a result, the flavor of tea beverage treated with the cation exchange resin was very good and was not spoilt. On the other hand, the taste of tea beverage in which the filtration with diatomaceous earth or the ultra-filtration was carried out was spoilt. The aroma was spoilt slightly by the ultra-filtration, and was spoilt remarkably by the filtration with diatomaceous earth.

What is claimed is:

1. A tea manufacturing process comprising:
   removing divalent metal ions from an extract of tea leaves, which have been extracted with warm or hot water, by subjecting the tea extract to a cation exchange treatment with a cation exchange resin ionically bonded to potassium ions.

2. A tea manufacturing process comprising:
   ionically bonding potassium ions to a cation exchange resin; and
   removing divalent metal ions from an extract of tea leaves, which have been extracted with warm or hot water, by subjecting the tea extract to a cation exchange treatment with a cation exchange resin ionically bonded to potassium ions.

3. The tea manufacturing process of claim 2, wherein said ionically bonding of potassium ions to the cation exchange resin comprises contacting the cation exchange resin with an aqueous potassium chloride solution.

4. The manufacturing process of claim 1 or 2 wherein said canton exchange treatment comprises filling said cation exchange resin bonded to potassium ions into a column and permitting said tea extract to flow through the filled column.

5. The manufacturing process of claim 1 or 2 wherein said cation exchange resin comprises a styrene-divinylbenzene copolymer resin having a sulfonic acid group, which is bonded to potassium ions.

6. The manufacturing process of claim 1 or 2 wherein the temperature of the tea extract and the temperature of the cation exchange resin at the time of cation exchange treatment are each within the range of 5° C. to 65° C.

7. The manufacturing process of claim 1 or 2 further comprising adjusting the pH of the tea extract in the range of 4.75 to 7 before said cation exchange treatment.

8. The manufacturing process of claim 1 or 2 comprising:

adjusting the pH of the tea extract to 7 or less before conducting said cation exchange treatment; and subjecting the tea extract to an ultra-high temperature sterilization treatment after said cation exchange treatment.

9. The manufacturing process of claim 1 or 2 comprising adjusting the electrical conductivity of the tea extract to 0.4 to 1 mS/cm after said cation exchange treatment.

10. The manufacturing process of claim 1 or 2 wherein the electrical conductivity of the tea extract is raised by the cation exchange treatment by an amount of 12.7 to 20.1%, and the electrical conductivity of the tea extract after cation exchange treatment is in the range of 0.4 to 1 mS/cm.

11. The manufacturing process of claim 1 or 2 wherein the cation exchanged is filled in transparent containers to obtain a tea beverage.

12. The manufacturing process of claim 1 or 2 wherein the cation exchanged tea extract is substantially concentrated.

13. The manufacturing process of claim 1 or 2 wherein the cation exchanged is concentrated and dried to obtain a tea powder extract.

14. The manufacturing process of claim 1 or 2 wherein the cation exchange resin recovered after said cation exchange treatment by ionically bonding potassium ions thereto.

15. The manufacturing process of claim 1 or 2 wherein said tea leaves are selected from the group consisting of unfermented tea, semi-fermented tea, strongly fermented tea, jasmine tea, and mixed teas of two or more kinds of said teas.

16. The manufacturing process comprising:

ionically bonding potassium ions to a styrene-divinylbenzene copolymer resin having a sulfonic acid group by contacting said resin with an aqueous potassium chloride solution;

filling the resin bonded to potassium ions a column; and subjecting a warm or hot water extract of tea leaves to cation exchange treatment by flowing the extract through the filled column.

17. The manufacturing process of claim 16 wherein the temperature of the tea extract and the temperature of the cation exchange resin at the time of cation exchange treatment are each within the range of 5° C. to 65° C.

18. The manufacturing process of claim 16 comprising adjusting the pH of the tea extract in the range of 4.75 to 7 before the cation exchange treatment.

19. The manufacturing process of claim 16 comprising:

adjusting the pH of the tea extract to 7 or less before conducting said cation exchange treatment; and subjecting the extract to an ultra-high temperature sterilization treatment after the cation exchange treatment.

20. The manufacturing process of claim 16 comprising adjusting the electrical conductivity of the tea extract to 0.4 to 1 mS/cm after the cation exchange treatment.

* * * * *